United States Patent

[11] 3,580,073

| [72] | Inventor | Howard E. Siebold<br>Libertyville, Ill. |
| --- | --- | --- |
| [21] | Appl. No. | 733,995 |
| [22] | Filed | June 3, 1968 |
| [45] | Patented | May 25, 1971 |
| [73] | Assignee | Liquid Controls Corporation<br>North Chicago, Ill. |

[54] TEMPERATURE COMPENSATOR
14 Claims, 9 Drawing Figs.

[52] U.S. Cl. .................................................. 73/233
[51] Int. Cl. .................................................. G01f 3/02
[50] Field of Search .................................................. 73/233,
232; 74/675, 681, 793

[56] References Cited
UNITED STATES PATENTS

| 1,723,231 | 8/1929 | Ellsworth ..................... | 74/675 |
| 3,220,284 | 11/1965 | Horvath ....................... | 74/793 |
| 3,299,705 | 1/1967 | Shallenberg et al. ......... | 73/233 |

OTHER REFERENCES
G. W. Michalec, "Gear Differentials Part 1" appearing in "Machine Design" of October 1955, pages 178 and 182

*Primary Examiner*—Richard C. Queisser
*Assistant Examiner*—Ellis J. Koch
*Attorney*—Fidler, Bradley, Patnaude & Lazo ABSTRACT: A temperature compensator modifies the output from a volumeter to compensate for the effect of temperature changes on the volume of a fluid being metered and includes a differential gear train having an output shaft that rotates at a speed equal to the rotational speed of one of its inputs, which is dependent on the volume of the fluid being measured, minus the rotational speed of its other input, which is dependent on the difference in temperature between the temperature of the fluid being metered and a standard temperature. The temperature-dependent input is controlled by a pair of reciprocating linkages, which are pivotally connected to a bellcrank, which pivots in response to a temperature-sensing device, for adjustably controlling the length of the stroke of the reciprocating linkages.

INVENTOR
HOWARD E. SIEBOLD

BY Fidler, Bradley & [illegible]
ATTY'S

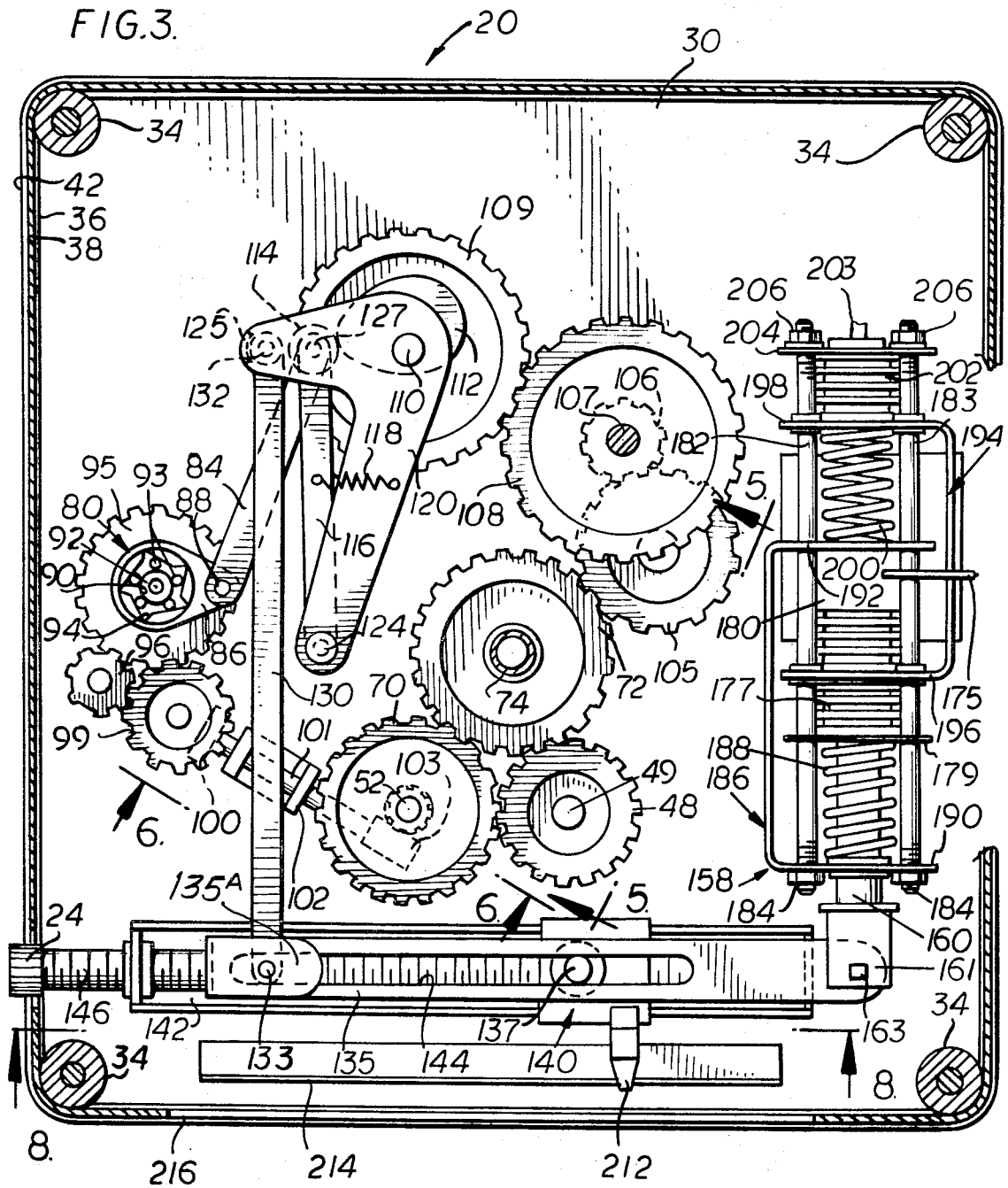

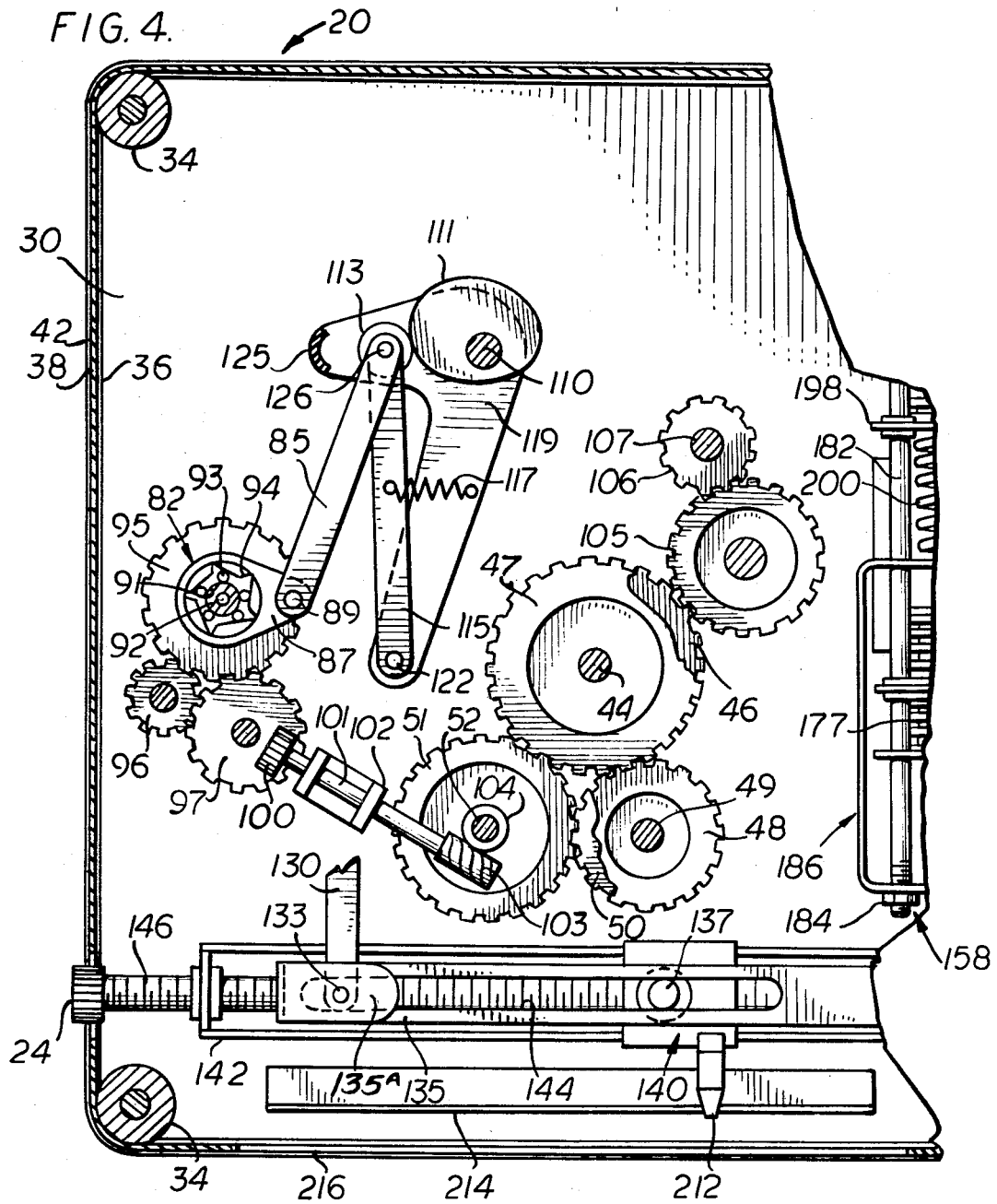

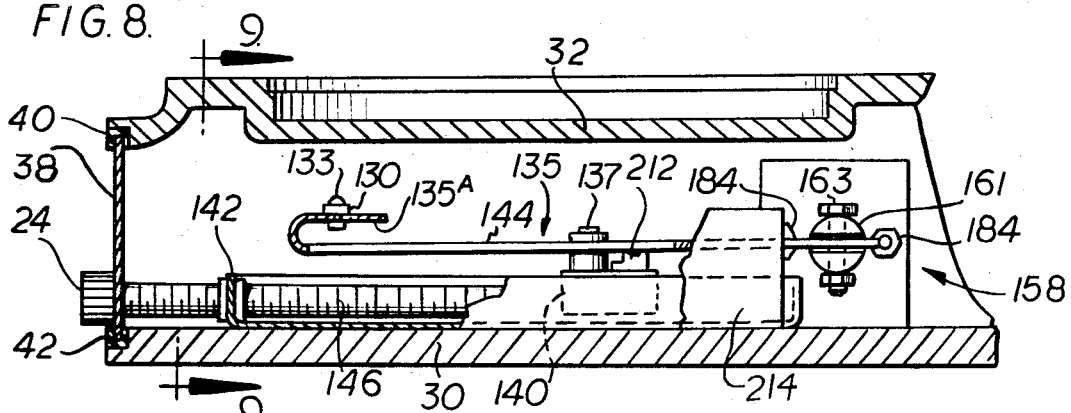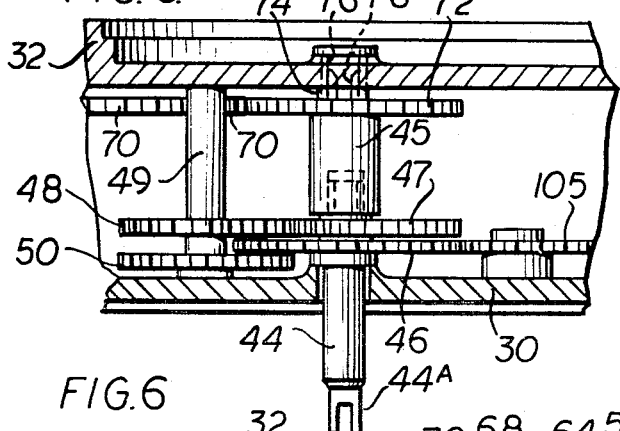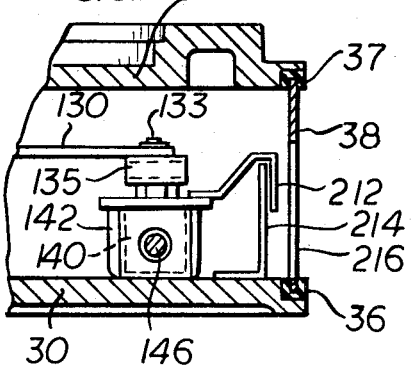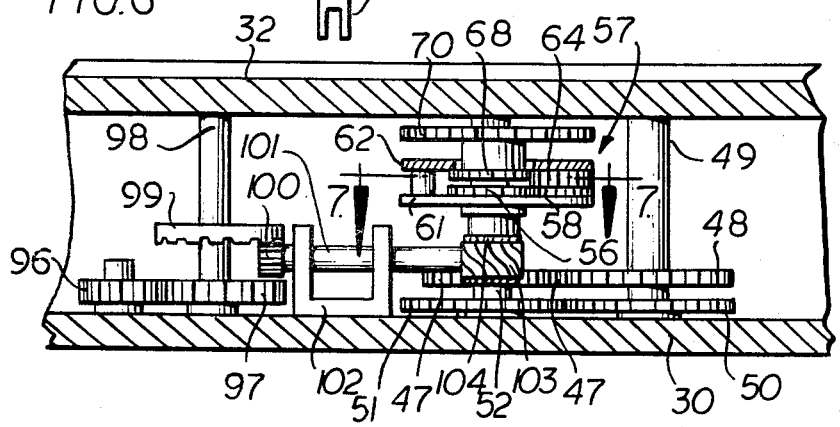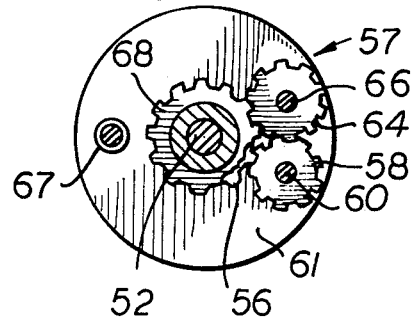

3,580,073

TEMPERATURE COMPENSATOR

BACKGROUND OF THE INVENTION

The present invention generally relates to temperature compensators, and it relates more particularly to a temperature compensator for automatically modifying the output from a volumetric-type flow meter or similar device to compensate for the effect of temperature changes on the volume of a fluid being metered.

The most practical way of metering a quantity of a gaseous or liquid fluid is by means of a volumeter which develops a mechanical output representative of the actual volume of liquid passing through the meter. Ordinarily, the volume measured by the meter is indicated by the number of rotations of an output shaft which may be conveniently connected to a counter for providing a visual or otherwise sensible indication of the number of rotations of the output shaft of the meter. The volume of fluid varies substantially with changes in temperature and while volumetric flow meters and associated counters of the type now available on the market provide a highly accurate indication and record of the actual volume of fluid being metered, for many purposes it is the mass of the fluid which is of importance and not its volume. Of course, the mass of a liquid is related to the volume by several factors, but the most important of these is the coefficient of thermal cubical expansion, the others being insignificant for most practical purposes. Assuming a given volumetric flow through the meter, the mass of the liquid being metered varies inversely with changes in temperature, and in order to compensate for this variation in volume, it is known in the art to interconnect a temperature-compensating device between the meter and the counter. Such a device has an input-output ratio inversely proportional to the ratio of the actual volume metered to the volume of the same quantity of liquid at a standard temperature, such as 60° F. for the petroleum industry, whereby the counter registers an amount representative of the mass of the fluid being metered, i.e., the counter provides a temperature-compensated volumetric reading.

One highly successful temperature compensator is disclosed in U.S. Pat. No. 3,299,705 and employs a differential gear train mechanism having its output shaft adapted for connecting to a counter and having one of its inputs adapted for connecting to the output of a volumetric meter or similar device with its other input connected to a temperature-responsive mechanism. The angular speed of rotation of the output shaft of the differential gear train mechanism is equal to the angular rotational speed of its flow-representative input plus the angular speed of rotation of its temperature-responsive input, which is representative of the difference in temperature between the temperature of the fluid being metered and the predetermined standard temperature. The temperature-responsive mechanism drives the temperature-responsive input to the differential gear train mechanism by means of a pair of reciprocating linkages via a pair of one-way clutches. The length of the strokes of the reciprocating linkages are controlled by a rotatably mounted guide block and a roller which is slidably mounted in a groove in the guide block and which moves in response to a temperature-sensing device to adjust the position of the pivot points for the reciprocating linkages.

While such a temperature compensator is highly accurate and reliable, the precision temperature-responsive mechanism for modifying the output of the differential gear train mechanism carried a substantial portion of the output load of the compensator. In this regard, the temperature-responsive mechanism positively drives the cage of the differential mechanism to increase the speed of rotation of the output shaft of the differential mechanism to provide the necessary compensation. Thus it would be desirable to have a compensator that employs a precision, lightweight mechanism for compensating the input to the compensator without driving the output of the compensator.

SUMMARY OF THE INVENTION

Therefore, a principal object of the present invention is to provide a new and improved automatic compensator which rotates an output shaft by an amount dependent both on the rotation of an input shaft to the compensator and the output of a compensating mechanism without having the compensating mechanism drive the output shaft of the automatic compensator.

Another object of the present invention is to provide a new and improved temperature compensator adapted for use with volumetric flow meters.

A further object of the present invention is to provide a new and improved temperature compensator which is adapted to be connected between a volumetric flow meter and a counter and which drives the counter by an amount dependent on the output of the flow meter as modified by an amount dependent on the temperature of the fluid being metered.

A still further object of the present invention is to provide a new and improved temperature compensator having the foregoing qualities and having a differential gear train mechanism which has an output shaft that rotates at a speed dependent on the speed of rotation of the input to the temperature compensator as modified by a compensating mechanism which does not drive the output shaft of the temperature compensator.

Briefly, the above and further objects are realized in accordance with the present invention by providing an automatic compensator having an output shaft that rotates at a speed equal to the speed of rotation of the input shaft to the compensator minus the speed of the output of a compensating mechanism. The compensator can be adapted for compensating the output of a volumetric flow meter for changes in temperature of the fluid being metered. The compensator includes a differential gear train which has an output shaft and a pair of inputs. The speed of rotation of one input is dependent upon the speed of rotation of an output shaft from the volumetric flow meter metering the fluid, and the speed of rotation of the other input, the cage of the differential gear mechanism, is dependent upon the difference in temperature between the temperature of the fluid being metered and a given standard temperature. As the temperature of the fluid being metered increases, the cage of the differential mechanism is permitted to rotate at an increasing rotational speed, and thus the compensation of the output shaft of the temperature compensator increases. For the minimum amount of compensation, the cage for the differential is held stationary by means of a worm and worm gear. The compensating mechanism includes a pair of reciprocating linkages which have a variable stroke depending upon the changes in temperature of the fluid being metered. In order to vary the amount of compensation in accordance with the changes in temperature of the fluid, the length of the strokes of the linkages are adjusted by a pair of pivotally mounted bellcranks which pivot in response to a temperature-sensing device to cause the pivot points of the reciprocating linkages to be moved a corresponding amount. For the purpose of compensating for the different types of fluids being metered and their various different coefficients of cubical expansion, the temperature-sensing device transfers its movement to the bellcranks by means of a pivotally mounted lever having a manually adjustable pivot point so that the pivot point can be moved to correspond to the particular fluid being metered.

BRIEF DESCRIPTION OF THE DRAWINGS

The invention, both as to its organization and method of operation, together with further objects and advantages thereof will best be understood by reference to the following detailed description taken in connection with the accompanying sheets of drawings, wherein:

FIG. 3 is a top plan view of the internal mechanism of the temperature compensator of the present invention, certain portions thereof being broken away to better illustrate the said mechanism;

FIG. 4 is a partial, plan view similar to FIG. 3 but taken through a lower horizontal plane;

FIG. 5 is a sectional view taken substantially along the line 5-5 of FIG. 3;

FIG. 6 is a sectional view taken substantially along the line 6-6 of FIG. 3;

FIG. 7 is a sectional view taken substantially along the lines 7-7 of FIG. 6;

FIG. 8 is a sectional view taken substantially along the line 8-8 of FIG. 3; and FIG. 9 is a sectional view taken substantially along the line 9-9 of FIG. 8.

DESCRIPTION OF THE PREFERRED EMBODIMENTS

Figure 1:
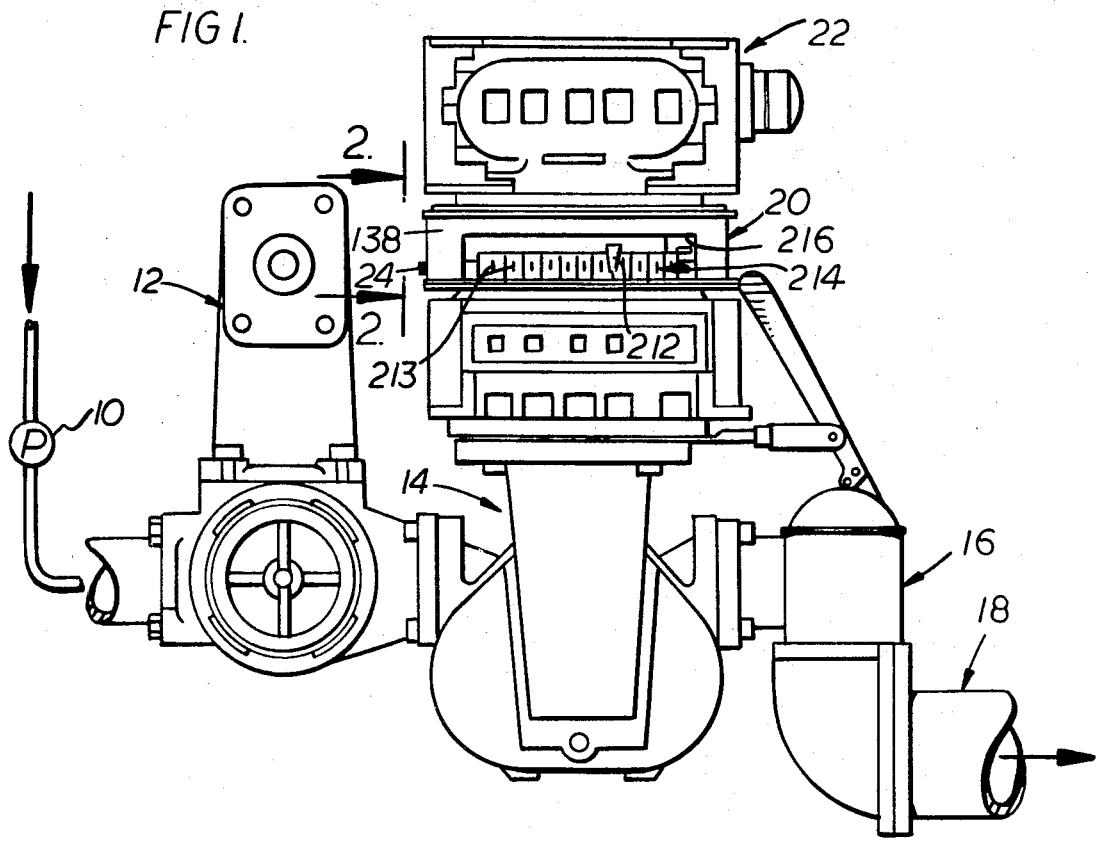
FIG. 1 is a view, partly schematic, illustrating a portion of a liquid transmission system in which the temperature compensator of the present invention finds particular application.

Referring now to the drawings and particularly to FIG. 1 thereof, a liquid transmission system includes a pump schematically indicated at 10 for pumping liquid from a supply tank (not shown) through an air eliminator 12 from which it passes to a volumetric flow meter and associated preset counter 14. After passing through the meter 14 the liquid flows through a pressure operated control valve 16 to an outlet conduit 18 from which it passes to other parts of the system. Mounted directly on top of the meter and preset counter 14 is a temperature compensator 20 which, in turn, supports a register 22 which provides a numerical record on the face thereof of the compensated volume of liquid which has passed through the meter 14. This system, exclusive of the temperature compensator 20, is more fully described in U.S. Pat. No. 3,083,874.

The temperature compensator 20 is driven from the output shaft of the meter 14 which rotates at a rate proportional to the volumetric rate of flow of liquid through the meter 14, and the register 22 is in turn driven by the output of the temperature compensator 20. As shown in detail hereinafter, the temperature compensator 20 includes a temperature-sensing probe (not visible in FIG. 1) which may be positioned at a location for sensing the temperature of the liquid entering the meter, and the compensator 20 further includes a manually adjustable knob 24 on the left side of the housing of the compensator 20 for entering the coefficient of thermal cubical expansion of the particular liquid being metered.

Referring now to FIGS. 2, 3, 4 and 5, the temperature compensator 20 includes a housing formed by a rectangular baseplate 30 and a top plate 32 which is also rectangular in cross section. A plurality of posts 34 cooperate with the top and bottom flat plate sections 30 and 32 to provide a chamber in which the operating parts of the temperature compensator 20 are primarily mounted. As best shown in FIGS. 8 and 9, the bottom plate 30 includes an annular peripheral rabbet 36 on the upper side thereof and the top plate 32 includes a similar downwardly facing rabbet 37 to secure a shroud 38 formed of a thin strip of a suitable sheet material such as stainless steel by means of a pair of U-shaped gasket strips 40 and 42, thereby to provide a housing which is attractive in appearance and which, in addition, has a peripheral envelope approximating that of the top portion of the flow meter and preset counter 14 with which the compensator 20 is primarily adapted for use.

As best shown in FIGS. 2, 3, 4 and 5, the temperature compensator 20 of the present invention includes an input shaft 44 having an axially depending flat key portion 44A which is adapted to be received in a complementary recess in the output shaft of the associated flow meter 14 whereby the input shaft 44 rotates at an angular velocity directly related to the rate of flow through the associated meter. The input shaft 44 is suitably journaled in a centrally disposed aperture in the baseplate 30, and a pair of spur gears 46 and 47 are keyed to the shaft 44 one above the other near the baseplate 30. The upper end of the shaft 44 is journaled in a cylindrical spacer 45. The upper gear 47 mates with an idler gear 48 which is keyed to a jack shaft 49. The gear 48 thereby drives another idler gear 50 which is keyed to the same jack shaft 49 just below the idler gear 48. As best shown in FIGS. 4 and 6, the idler gear 50 mates with and thereby drives a spur gear 51 which is keyed to a jack shaft 52 journaled in the baseplate 30 and in the top plate 32. Also keyed to the shaft 52 is a sun gear 56 which is part of a differential mechanism or gear train 57. Within the differential gear mechanism 57, as best shown in FIGS. 6 and 7, the sun gear 56 drives a planet gear 58 which is freely rotatable on a jack shaft 60 extending between a pair of plates 61 and 62 (FIG. 6) which form the cage of the differential mechanism 57. The planet gear 58 meshes with and drives a second planet gear 64 which is mounted on a jack shaft 66 suitably secured between the cage plates 61 and 62. An additional spacer stud 67 is mounted between the cage plate 61 and 62 to maintain the plates 61 and 62 in mutual parallel relationship. The planet gear 64 mates with and thus drives an output sun gear 68 which is integral with a spur gear 70 which mates with and drives a gear 72 (FIGS. 3 and 5) keyed to the spacer shaft 45 suitably journaled in a centrally disposed bushing 74 mounted in the top plate 32. As shown in FIG. 5, the shaft 45 is adapted to be coupled to a register, such as the register 22, having a shaft identical to the shaft 44. Accordingly, the outer end of the spacer shaft 45 has an axially directed rectangular slot 76 having a lower reduced portion 78 for receiving a depending axial key having a reduced end portion on the shaft of the associated counter or other device.

As thus far described, it will be apparent that as the input shaft 44 is rotated, torque is coupled to the output shaft 45 through the differential gear train 57. Accordingly, by permitting the cage of the differential mechanism 57 to rotate, the shaft 45 is rotated at a speed proportional to the speed of the sun gear 56 minus the speed of the cage 61, 62. The drive ratio of the input shaft 44 to the output shaft 45 is appropriately stepped-up so that when the differential cage is held stationary, a minimum amount of compensation occurs and the output shaft 45 rotates at a speed compensated to the standard temperature. This is the minimum compensation for the particular compensator, and is the minimum temperature of the range of temperatures that can be compensated for by the particular compensator. Thus, as the temperature of the fluid being metered increases, the input shaft 44 rotates at a faster speed and a correspondingly greater amount of compensation is supplied to the cage 61, 62 to subtract from the rotational speed of the input shaft 44, whereby the speed of the output shaft 45 is continuously compensated to the standard temperature.

Figure 2:
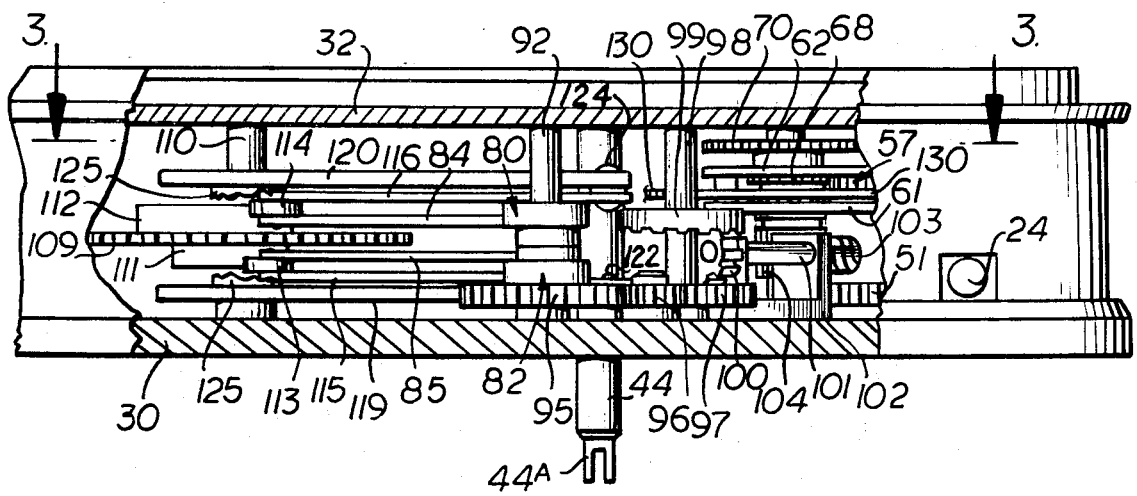
FIG. 2 is a sectional view taken substantially along the lines 2-2 of FIG. 1.

In order to rotate the cage of the differential mechanism 57 thereby to subtract the temperature-compensating factor from the input supplied via the sun gear 56, as shown in FIGS. 2, 3 and 4, there is provided in accordance with an important feature of the present invention a pair of one-way Torrington clutches 80 and 82 which are respectively driven by a pair of reciprocable linkage arms 84 and 85. The clutches 80 and 82 are identical and as best shown in FIGS. 3 and 4, the clutch 80 includes a circular plate 86 and the clutch 82 includes a corresponding circular plate 87. The circular plate 86 is pivotally connected to the linkage member 84 by means of a stud 88. A stud 89 pivotally connects the linkage arm 85 to the circular plate 87 of the clutch 82 in a like manner. The plates 86 and 87 include central circular apertures 90 and 91, respectively, which rotatably receive a cylindrical shaft 92 which is suitably journaled for rotation between the baseplate 30 and the top plate 32. A plurality of rollers 93 are mounted in respective ones of a plurality of sawtooth-shaped recesses 94 in the plates 86 and 87 of the respective clutches 80 and 82, such that the rollers 93 are urged against the shaft 92 when the plates 86 and 87 are rotated in a counterclockwise direction, as viewed in FIGS. 3 and 4, to cause the shaft 92 to rotate in unison with the plates 86 and 87. On the other hand, the plates 86 and 87 of the respective clutches 80 and 82 may rotate freely with respect to the shaft 92 in a clockwise direction since the rollers can then move into another portion of the sawtoothed recess 94 away from the shaft 92. The operation of this type of clutch is well known in the art and need not be further described.

As best shown in FIGS. 2, 3 and 4, during compensation the reciprocating linkage arms 84 and 85 and the clutches 80 and 82 cause the shaft 92 to continuously rotate and thus cause a spur gear 95, which is keyed to the shaft 92, to rotate. The spur gear 95 in turn mates with and drives an idler gear 96 which is suitably journaled in the baseplate 30. As best shown in FIGS. 2 and 6, the idler gear 96 mates with and causes to rotate a spur gear 97, which is keyed to a jack shaft 98 which is journaled for rotation between the plates 30 and 32. The rotation of the spur gear 97, in turn, causes the rotation of a crown gear 99, which is also keyed to the shaft 98 above the spur gear 97 and which mates with a pinion 100. The pinion 100 is in turn keyed to one end of a horizontally disposed shaft 101 which is journaled for rotation in a U-shaped support block 102. In order to hold the cage 61, 62 stationary for minimum compensation and to permit the cage 61, 62 to rotate for purposes of compensation, a worm 103 is keyed to the opposite end of the shaft 101 and mates with a worm gear 104 which is a fixed part of and depends from the lower cage plate 61 of the differential mechanism 57. The cage plates 61 and 62 are centrally apertured and freely receive the shaft 52 on which they are rotatably mounted. The worm gear 104 also freely rotates with respect to the shaft 52. As a result, the rotation of the shaft 92, which is caused to be driven by the clutches 80 and 82, is transferred to the worm 103 to permit the cage of the differential gear mechanism 57 to rotate for compensation purposes. Thus, the speed of the output shaft 45 is compensated to the standard temperature without having the shaft 92 drive the output shaft 45.

As mentioned hereinbefore and as described more fully hereinafter, the linkage arms 84 and 85 are reciprocated at a frequency directly related to the rotational velocity of the input shaft 44 and the length of the stroke of the linkage arms 84 and 85 is adjusted by an amount dependent upon the expansion or contraction of the liquid being metered from a standard level. This amount of adjustment is equal to the product of the velocity of rotation of the input shaft 44, the coefficient of expansion, and the difference in temperature from a standard value. Moreover, the linkage members have overlapping drive strokes thereby to cause continuous and noncyclical rotation of the shaft 92.

Referring now to FIGS. 3, 4 and 5, in order to reciprocate the linkage arms 84 and 85 at a frequency which is directly related to the rotational speed of the input shaft 44 and thus at a frequency proportional to the volume being metered, the spur gear 46 keyed to the input shaft 44 mates with and drives an idler gear 105 which is suitably journaled for rotation on the baseplate 30. The idler gear 105 mates with a pinion gear 106 which is keyed to a jack shaft 107. The jack shaft 107 is suitably journaled for rotation between the plate 30 and 32. A spur gear 108 (FIG. 3) is also keyed to the jack shaft 107 and drives a spur gear 109 which is keyed to a jack shaft 110 suitably journaled for rotation between the plates 30 and 32. A pair of straight-line or linear cams 111 and 112 are fixed to the shaft 110 and are oriented at 180° with respect to one another and have overlapping linear cam portions. As best shown in FIG. 2, the cams 111 and 112 are mounted in a spaced-apart relationship with the gear 109 mounted therebetween. A pair of freely rotatable follower rollers 113 and 114 ride against the edge camming surfaces of the respective cams 111 and 112. The follower rollers 113 and 114 are freely and rotatably mounted on a pair of respective linkage arms 115 and 116, and the rollers are resiliently urged into engagement with the camming surfaces of the cams 111 and 112 by means of a pair of respective tension springs 117 and 118 which are stretched between their respective linkages 110 and 112 and a pair of bellcranks 119 and 120. The ends of the bellcranks 119 and 120 are pivotally connected to the respective roller linkage arms 115 and 116 by a pair of pintles 122 and 124, respectively. The bellcranks 119 and 120 are pivotally mounted on the shaft 110 in vertical alignment and are integrally joined at their opposite ends by a web 125 (shown partly broken away in FIG. 2).

The cams 111 and 112 are thus rotated at an angular velocity directly related to the rotational speed of the input shaft 44, whereby the linkage arms 115 and 116, oscillate or cycle at a rate or frequency directly related to the rotational speed of the input shaft 44. Thus, since the linkage arms 84 and 85 are pivotally connected to the follower rollers 113 and 114, the linkage arms 84 and 85 reciprocate or cycle also at a rate or frequency related to the rotational speed of the input shaft 44. Stated another way, the linkage arms 84 and 85 reciprocate through a fixed number of cycles for each revolution of the input shaft 44. The maximum length of the stroke of the linkage arms 84 and 85 is fixed and is in no way adjustable in this particular device. If desired, however, such length could be adjustable to compensate for dimensional tolerances in the various parts of the overall mechanism.

As best shown in FIGS. 3 and 4, the linkage arms 115 and 116 are respectively connected through a pair of pintles 126 and 127 to the linkage arms 84 and 85 which are pivotally connected to and drive the respective clutches 80 and 82. As the rollers 113 and 114 are caused to move back and forth under the influence of the cams 111 and 112, the linkage members 115 and 116 oscillate about their respective pintles 122 and 124 and thus the rollers 113 and 114 travel through an arc having a radius equal to the distance between the center of the pintles 122 and 124 and the center of the pintles 113 and 114, respectively. The linkage arms 84 and 85, being pivotally connected to the respective rollers 113 and 114, are reciprocated in like manner by the rollers 113 and 114 through a stroke whose length depends upon the location of the pivot points for the linkages 115 and 116. The orientation of the pivot points are determined by the orientation of the bellcranks 119 and 120, which move in unison due to the integral web 125 connecting them. If the bellcranks 119 and 120 are disposed in such a position that the linkages 115 and 116 are caused to be disposed in vertical alignment with the reciprocable linkage arms 84 and 85, rollers 113 and 114 are caused to travel along an arc by their respective cams 112 and 111, but the linkages 84 and 85 do not move longitudinally and thus do not reciprocate. As a result, the clutches 80 and 82 are not driven, and hence the cage of the differential gear train mechanism 57 is held stationary. In this case, the linkage arms 84 and 85 merely oscillate about the points of pivotal connection to the clutch plates 86 and 87, and no torque is exerted through the clutches 80 and 82 on the worm 103 so that the cage of the differential gear train mechanism 57 is held stationary by the worm 103. Accordingly, no compensating factor is subtracted from the output of the differential and the output shaft is driven at the maximum stepup ratio of the temperature compensator. For all other positions of the bellcranks 119 and 120, a compensation factor is subtracted from the input 44 via the worm 103 which permits the cage of the differential mechanism 57 to rotate.

As best shown in FIG. 3, in order to pivot the bellcranks 119 and 120 by an amount necessary to subtract the proper compensating factor from the input 44 of the differential mechanism 57, a linkage arm 130 (shown broken away in FIGS. 2 and 4) is pivotally connected to the upper bellcrank 120 by means of a pintle 132. The linkage arm 130 thereby causes the integrally connected bellcranks 119 and 120 to pivot in unison to properly orient the pivot points for the linkages 115 and 116. The opposite end of the linkage arm 130 is pivotally connected by means of a pin 133 to a lever 135, which is pivotally mounted at 137 on a T-shaped block 140. As best illustrated in FIGS. 8 and 9, the block 140 fits into an opened-top, trough-shaped support 142. The block 140 rests on the top edges of the support 142 and slides therealong to provide an adjustably movable pivot point for the lever 135.

The lever 135 includes an elongated slot 144 (FIGS. 3 and 4) for guiding the pivotal connection 137 for the lever 135. The block 140 is adjustably moved along the support 142 by means of a screw 146 which extends along the length of the support 142 and which is suitably journaled for rotation in the sidewalls thereof. The block 140 is provided with an internally threaded hole for threadably receiving the screw 146 so that upon rotating the knob 24 which is connected to one end to the screw 146, the block 140 moves either toward or away from the knob 24 depending upon the direction of rotation of the knob 24. Thus, the relative position of the block 140 with respect to the guide support 142 may be adjusted by rotating the knob 24 to set the compensator 20 for a particular coefficient of cubical expansion of the liquid being metered.

The position of the lever 135 is controlled by a temperature-responsive bellows assembly 158 which includes an axially movable output element 160 which is positionable along its longitudinal axis in accordance with the temperature of the liquid being metered. As best seen in FIG. 8, the rodlike element 160 has a slotted head portion 161 which is pivotally connected to one end of the linkage 135 which fits in the slot of the head 161 and which is apertured to receive a bolt and nut 163 extending through aligned holes in the head 161.

As will become clear as the description proceeds, the length of the stroke of the reciprocable linkages 84 and 85 is continuously adjusted by a sufficient amount to cause the speed of rotation of the output shaft 45 to be equal to the rotational speed of the input shaft 44 times the product of (1) the change in temperature between the temperature of the liquid being metered and the standard temperature, and (2) the coefficient of thermal cubical expansion. The bellows assembly 158 produces the temperature factor, and the lever 135 causes the temperature factor to be multiplied by the thermal expansion coefficient to thereby cause a resulting movement of the linkage arm 130. The resulting temperature-expansion product as reflected by the movement of the linkage 130 is caused to be multiplied by the speed of rotation of the input shaft 44 by means of the bellcranks 119 and 120 which pivot in response to the linkage arm 130.

It may thus be seen that as the output element 160 of the bellows assembly 158 moves outwardly the lever 135 pivots in a clockwise direction (FIG. 3) thereby to move the linkage arm 130, whereby the bellcranks 119 and 120 pivot in unison in a clockwise direction. As best seen in FIG. 8, the linkage 130 is pivotally mounted on the top of the free end of a reversely bent, U-shaped end portion 135A of the lever 135 so that the block 140 can be adjustably moved until the pivot point 137 of the lever 135 is directly under the pivot point 133 of the linkage 130, this condition existing when the liquid being metered has a coefficient of expansion of zero. In this position, any pivotal movement of the lever 135 in response to the temperature-responsive bellows assembly 158 is not transmitted to the linkage 130 since the lever 135 then pivots about a point in vertical alignment with the pivotal connection of the linkage 130 to the lever 135. In this condition of operation the output shaft 45 rotates in unison with the input shaft 44 and this is, of course, as it must be where the volume of the liquid does not vary with temperature. Any other positions of the block 140 enables the bellows assembly 158 to pivot the lever 135 and thereby cause a corresponding movement of the linkage 130.

The bellows assembly 158 is best shown in FIG. 3, and it includes a plurality of expandible bellows for axially positioning the rod 160 in accordance with the temperature sensed thereby. Normally, this temperature is the temperature of the liquid being metered. As the temperature of the liquid being metered increases, the rod 160 retracts. As the temperature decreases, the rod 160 moves extensively.

However, it is necessary to compensate for the ambient temperature changes which will also affect the volume in the bellows due to the ambient temperature at the location of the compensator 20. For this purpose, the bellows assembly 158 includes a normally sealed-off filler tube 175 and an ambient temperature compensating bellows 177.

The bellows 177 is located between and fixedly connected to a plate 179 and a block 180 which is passaged to connect the tube 175 to the bellows 177. The plate 179 is slidably mounted on a pair of parallel support rods 182 and 183. The rods 182 and 183 are threaded at their lower ends as shown in FIG. 3 and a pair of nuts 184 are threadedly secured thereon to provide stops against which a U-shaped bracket 186 is pressed by a coil spring 188 mounted between the plate 179 and a plate portion 190 of the bracket 186. The bracket 186 also has a plate portion 192 slidably fitted on the rods 180 and 182. A U-shaped bracket 194, which is fixed to the base 30, has a pair of parallel plate portions 196 and 198 slidably receiving the rods 182 and 183 and a coil spring 200 is compressed between the plate portions 192 and 198.

In order to cause the rod 160 to move in response to changes in the temperature of the liquid being metered, a conduit 203 is connected to a probe (not shown) which is adapted to be strategically located in the liquid being metered and as close a position to the volumeter as is reasonably possible. The sensing probe is of a type well known in the prior art and includes a bulb portion which connects to the conduit 203 which in turn connects with a bellows 202. The bellows 202, the conduit 203, and the bulb (not shown) form a closed system which is entirely filled with a fluid which expands with increases in temperature.

The bellows 202 is mounted between the plate portion 198 and a plate 204 held in place on the rods 183 and 182 by the nuts 206. Accordingly, as the fluid in the probe expands, the bellows 202 expands thereby tending to move the rods 182 and 183 upwardly as viewed in FIG. 3 since the support bracket 194 is fixed to the base 30. Thus, the rods 182 and 183 tend to move the plate 190 of the slidably mounted bracket 186 in an upward direction so that the plate 192 tends to move the block 180 and the bellows 177 in the same direction to cause the rod 160 to retract.

Accordingly, as the fluid which fills the bellows 202 expands as a result of an increase in the ambient temperature, the bellows 177 expands to cause the element 160 to move through a distance equal to the difference in the lengths of movement of the bellows 177 and 202. Preferably, these bellows have equal volumes. Compensation for expansion of the bellows 202 due to the ambient temperature at the bellows is thus compensated by the bellows 177.

In order to adjust the position of the pivot point 137 for the lever 135 thereby to enter the coefficient of cubical expansion factor into the compensator 20, the knob 24 extends through an opening in the shroud 138 at the left side of the temperature compensator 20, as shown in FIG. 1, until a pointer 212 mounted on the block 140 is moved opposite the particular one of the graduated markings 213 on the face plate 214 as seen through an opening 216 in the front shroud 138. A transparent plate (not shown) may cover the opening 216, and the plate may include graduations thereon for a vertical reference line in place of the face plate 214.

OPERATION

In order to ensure a complete understanding of the present invention, the following typical operations are described. When a liquid flows through the volumetric flow meter 14, rotation of the input shaft 44 of the temperature compensator 20 will result and the speed of rotation of the shaft 44 will be directly related to the rate of volumetric flow through the meter 14. If the counter 22 were to be connected directly to the meter 14, it would register the precise volume of liquid flowing through the meter 14. However, as discussed hereinbefore, this figure is not meaningful inasmuch as the volume of the liquid may change so greatly as a result of changes in temperature. The temperature compensator 20 thus modifies the rate of rotation of the output shaft from the meter 14 and couples the modified rate of rotation to the counter 22. Inasmuch as the standard temperature used in most industries is 60° F., the temperature compensator is designed such that the output shaft 45 and the input shaft 44 rotate at the same rate of speed when the temperature of the liquid being metered is 60° F., irrespective of the coefficient of cubical expansion of the liquid. Furthermore, when the liquid being metered has a coefficient of expansion of zero, the output shaft 45 and input shaft 44 rotate at the same rate of speed irrespective of the temperature of the liquid. Rotation of the shaft 44 is coupled via the gears 47, 48, 50 and 51 to the sun gear 56 of the differential gear train 57 whose output sun gear 68 is directly connected to the gear 70 which drives the output shaft 45 through the gear 72 which is keyed thereto.

Considered in greater detail, the rotational speed of the input shaft 44 is multiplied by the product of (1) the difference in temperature between the temperature of the liquid being metered and the standard temperature, and (2) the coefficient of thermal, cubical expansion. The resulting product is produced by the lever 135 since the position of its movable pivot point 137 reflects the coefficient of thermal cubical expansion and the position of the rod 160 of the bellows assembly 158 represents the changes in temperature of the liquid being metered.

The rotational velocity of the input shaft 44 is multiplied by the temperature-expansion product by means of the bellcranks 119 and 120 and the cams 111 and 112 since the temperature-expansion product is represented by the movement of the linkage arm 130 which is pivotally connected at one end to the lever 135 and is pivotally connected at its other end to the bellcranks 119 and 120. Thus the movement of the bellcranks 119 and 120 cause a change in the length of the stroke of the reciprocating linkages 84 and 85, whereby the compensation factor is transferred to the cage 61, 62 of the differential mechanism 57 via the one-way clutches 80 and 82 and the worm 103. Thus, when a greater amount of compensation is required, such as when an increase in temperature occurs, the length of the strokes of the linkages 84 and 85 is increased to cause the worm 103 to rotate at a faster speed so that the cage 61, 62 is permitted to rotate at a faster speed thereby reducing the rotational speed of the output shaft 45 by an amount equal to the speed of rotation of the cage 61, 62. Hence, since the worm 103 merely permits the cage 61, 62 to rotate, the output of the compensator 20 is modified by a compensation factor which is entered into the cage 61, 62 of the differential mechanism 57 by the worm 103 without having the worm 103 and the other precision elements of the compensating mechanism carry a portion of the output load.

When the temperature of the liquid being metered is a temperature which is the minimum temperature in the range of temperatures to be compensated, the minimum amount of compensation is required, and hence the cage 61, 62 of the differential mechanism 57 is held stationary. In this regard, the linkage arms 84 and 85 do not reciprocate, and thus no torque is applied to the worm 103 via the one-way clutches 80 and 82 so that the worm 103 does not permit the cage 61, 62 to rotate. In order to cause the linkage arms 84 and 85 to cease reciprocating, the bellcranks 119 and 120 cause the linkage arms 115 and 116 to move into alignment with the reciprocable linkage arms 84 and 85. Therefore, with the cage 61, 62 being held stationary when the temperature of the liquid is at the minimum temperature (a temperature less than the standard temperature), the output shaft 45 rotates at a speed compensated to the standard temperature, which speed is greater than the speed of rotation of the input shaft 44 due to the stepup ratio of the gears coupling the input to the output of the compensator 20.

When the temperature of the liquid being metered is the standard temperature, the cage 61, 62 of the differential gear train 57 is permitted to continuously rotate by an amount such that the input shaft 44 and the output shaft 45 rotate in unison. In this case, the rod 160 of the bellows assembly 158 occupies a position as illustrated in FIG. 3 in such a manner that the rod 160 is perpendicular to the lever 135. Therefore, at this standard temperature, rotation of the knob 24 and the consequent movement of the block 140 and pivot point 137 have no effect whatever on the linkage member 130 since the linkage member 130 is also disposed at a perpendicular orientation relative to the lever 135. Hence, at the standard temperature the coefficient of expansion of the material being metered does not have an effect on the output shaft 45 of the compensator 20. When this condition exists, the lever 135 and thus the linkage 130 are oriented in such a position that the reciprocating linkage arms 84 and 85 cause the worm 103 to rotate at such a speed that the cage 61, 62 of the differential mechanism 57 is permitted to rotate so as to reduce the output speed of the shaft 45 to the compensated value at the standard temperature.

When the liquid being metered has a coefficient of thermal expansion equal to zero, the block 140 is manually set to a position where the pivot point 137 for the lever 135 is located directly under the pivot point 133 for the linkage 130 so that any movement of the rod 160 of the bellows assembly 158 has no effect whatever on the linkage arm 130. This condition is necessary since changes in temperature should not have an effect on the compensating factor when the coefficient of thermal cubical expansion is zero. When the block 160 is set at a particular position other than that corresponding to a coefficient of expansion of zero, an increase in temperature causes the linkage 130 to move an amount corresponding to the movement of the rod 160 and the position of the block 140.

The differential cage 61, 62 is permitted to continuously rotate so that the register 22 will at all times provide an instantaneously accurate indication of the amount of liquid which has flowed through the meter 14 and so that pulsating loads are not applied to the mechanism. For this purpose, the cams 111 and 112 have somewhat overlapping cam surfaces so that the operating strokes of the linkage members 84 and 85 also overlap in a noncyclical manner. In this regard, for example, near the end of the forward stroke of the linkage member 84 and the linkage member 85 commences its forward stroke so that both linkage members 84 and 85 are, for a short time, simultaneously driving the clutches.

It will be apparent from the foregoing description that the automatic compensator 20 of the present invention causes the rotational velocity of the input shaft to the compensator to be modified by a certain amount in response to a compensating mechanism which does not carry any of the output load and hence does not drive the output of the automatic compensator. In this regard, the automatic compensator of the present invention can be adapted for connecting to the output shaft of a volumetric flow meter metering a particular fluid and can be adapted for modifying the rotational velocity of the input to the compensator in accordance with the changes in the temperature of the fluid being metered and the coefficient of cubical expansion for the particular fluid. The output speed of the temperature compensator is automatically controlled by a differential gear train which has a pair of inputs. One of the inputs of the differential gear train is connected to the input to the temperature compensator and the other input is dependent upon the temperature changes. The rotational velocity of the output from the differential gear train is equal to the input velocity from the volumetric flow meter minus the speed associated with the change in temperature of the fluid being metered. This latter amount which is subtracted from the input speed is derived from changes in stroke length of a pair of reciprocating linkages as controlled by a pair of bellcranks which are pivoted by means of a temperature-responsive mechanism. The reciprocating linkages are coupled to the cage of the differential gear train mechanism by a pair of one-way clutches and a worm gear which permits the cage to rotate when compensation is required. Thus, when compensation is required, the compensator multiplies the rotational velocity of the input to the compensator, times the difference in temperature of the fluid from the standard temperature, times the coefficient of thermal cubical expansion.

While the present invention has been described in connection with a particular embodiment thereof, it will be understood that those skilled in the art may make many changes and modifications without departing from the invention. Ac-

I claim:

1. A temperature-compensating coupling adapted to be interconnected between a meter which is driven in proportion to the actual volume of a product being metered and a register, said coupling driving said register in proportion to the volume of said product at a standard temperature, comprising
   an input means for drivingly connecting said coupling to the output of said meter,
   an output means for drivingly connecting said coupling to said register,
   a differential gear train having a first rotatable input member and a second rotatable input member, said differential gear train further including an output member for rotating in response to the rotation of one or both of said input members by an amount proportional to the difference of the angular rotations of said input members,
   means responsive to the temperature of said product and driven by said input means for retarding the rotation of said output member in proportion to the difference between the actual volume being metered and the volume thereof at a predetermined temperature,
   said means responsive to the temperature of said product including a control means connected to said first input member of said differential gear train for permitting rotation of said first input member to reduce the rate of rotation of the output member in proportion to the difference between the actual volume being metered and the volume thereof at a predetermined temperature,
   whereby loading stresses on the control means are reduced because the control means affects but does not drive said output means.

2. A temperature-compensating coupling according to claim 1, wherein said control means includes a unidirectional drive means connected to said first input member of said differential gear train for permitting rotation of said first input member to retard the rotation of the output member and for preventing said first input member from rotating in an opposite direction.

3. A temperature-compensating coupling according to claim 2, wherein said unidirectional drive means comprises a worm and a worm gear.

4. A temperature-compensating coupling according to claim 2, in which said control means includes reciprocable means for driving said unidirectional drive means, means for driving said reciprocable means in response to said input, and lever means for adjusting the length of the stroke of said reciprocable means in response to the temperature of said product.

5. A temperature-compensating coupling according to claim 4, wherein said lever means comprises a pair of bellcranks rotatably mounted in alignment with one another and a web fixedly connecting the bellcranks so that the bellcranks are pivotable in unison with one another.

6. A temperature-compensating coupling according to claim 4, wherein said unidirectional drive means comprises a worm and a worm gear, said reciprocable means comprising a pair of one-way clutches for driving said worm and a pair of reciprocable linkage arms for driving said one-way clutches.

7. A temperature-compensating coupling according to claim 6, wherein said means for driving said reciprocable means comprises a plurality of cams driven by said input and a plurality of pivotally mounted cam followers operatively connected to said cams to be driven thereby and to drive said reciprocable linkage arms, said lever means comprising a pair of bellcranks rotatably mounted in alignment with one another and a web fixedly connecting the bellcranks so that the bellcranks are pivotable in unison with one another, one of the ends of said bellcranks being movable in response to the temperature of said product and the opposite ends of said bellcranks being pivotally connected to a pair of linkage arms for controlling the movement of said cam followers to adjust the length of the stroke of the reciprocable linkage arms by causing a change in the position of the pivot points of the cam followers to control the velocity of rotation of said output in accordance with the temperature of said product.

8. A temperature-compensating coupling according to claim 4, said means responsive to the temperature of said product further including means for causing the rotation of said output member of said differential gear train to be retarded in proportion to the coefficient of thermal cubical expansion for the product being metered.

9. A temperature-compensating coupling according to claim 8, wherein the last-mentioned means comprises a pivotally mounted lever having an adjustably movable pivot point, one end portion of the lever being movable in response to the temperature of said product being metered and an opposite end of the lever being pivotally connected to a linkage arm, said linkage arm being pivotally connected to said lever means, whereby the pivot point of the lever can be manually adjusted to compensate for the particular coefficient of cubical thermal expansion of said product being metered and said lever means can be moved to adjust the length of the stroke of said reciprocable means in response to the temperature of said product and the coefficient of thermal cubical expansion of said product.

10. A temperature-compensating coupling according to claim 9, wherein said lever has a reversely bent U-shaped end portion and means connected to the free end of the U-shaped end portion of the lever for pivotally connecting to the linkage member, and said lever further includes an elongated slot for receiving and guiding the pivot point for said lever, said elongated slot extending opposite the free end of the U-shaped end portion so that the movable pivot point can be moved to a position in alignment with the pivot point of the linkage to provide a zero compensation for a product having a coefficient of thermal cubical expansion equal to zero.

11. A temperature-compensating coupling according to claim 10, further comprising a troughlike support member for rotatably supporting a screw and for guiding a T-shaped block member which slidably fits into the support member and which has an internally threaded hole for receiving the screw, said movable pivotal connection for said lever being mounted on the block member so that upon rotation of the screw the block member moves along the screw as guided by the support member to adjust the position of said movable pivot point of said lever.

12. A temperature-compensating coupling according to claim 11, wherein said lever means comprises a pair of bellcranks rotatably mounted in alignment with one another and a web fixedly connecting the bellcranks so that the bellcranks are pivotable in unison with one another.

13. A temperature-compensating coupling according to claim 12, wherein said unidirectional drive means comprises a worm and a worm gear, said reciprocable means comprising a pair of one-way clutches for driving said worm and a pair of reciprocable linkage arms for driving said one-way clutches.

14. A temperature-compensating coupling according to claim 13, wherein said means for driving said reciprocable means comprises a plurality of cams driven by said input and a plurality of pivotally mounted cam followers operatively connected to said cams to be driven thereby and to drive said reciprocable linkage arms, said lever means comprising a pair of bellcranks rotatably mounted in alignment with one another and a web fixedly connecting the bellcranks so that the bellcranks are pivotable in unison with one another, one of the ends of said bellcranks being movable in response to the temperature of said product and the opposite ends of said bellcranks being pivotally connected to a pair of linkage arms for controlling the movement of said cam followers to adjust the length of the stroke of the reciprocable linkage arms by causing a change in the position of the pivot points of the cam followers to control the velocity of rotation of said output in accordance with the temperature of said product.